Feb. 26, 1924.
1,484,989
H. HAWK
BRAKE
Filed April 7, 1923
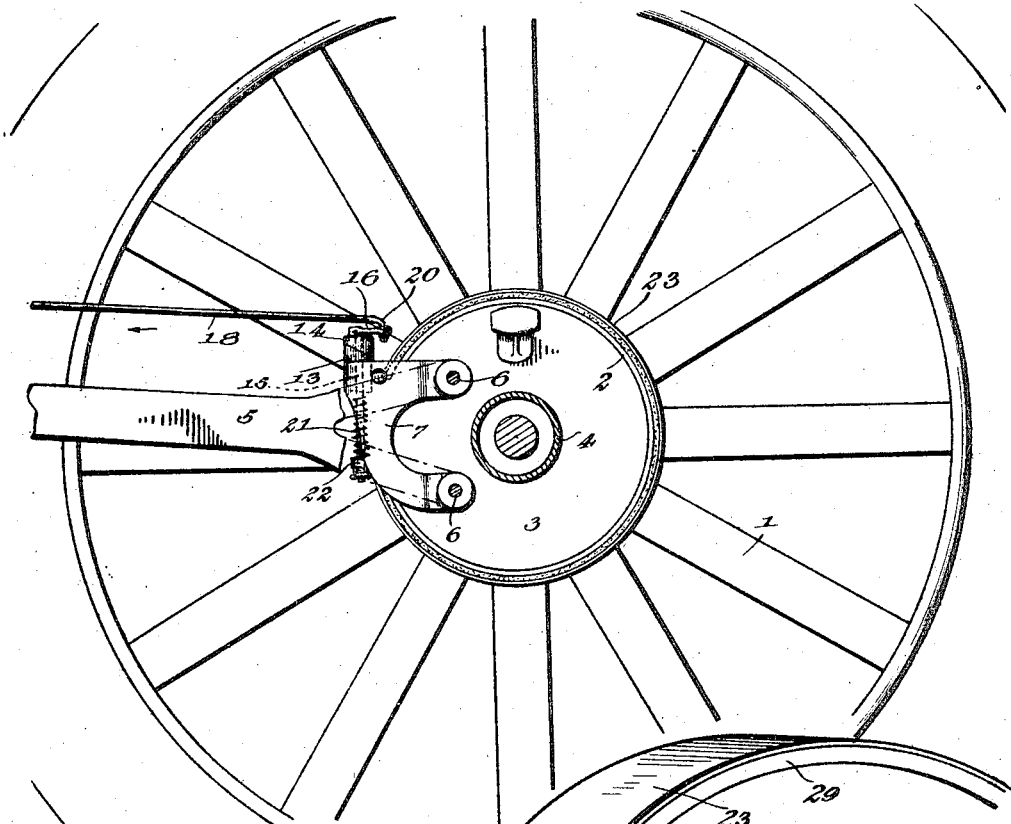
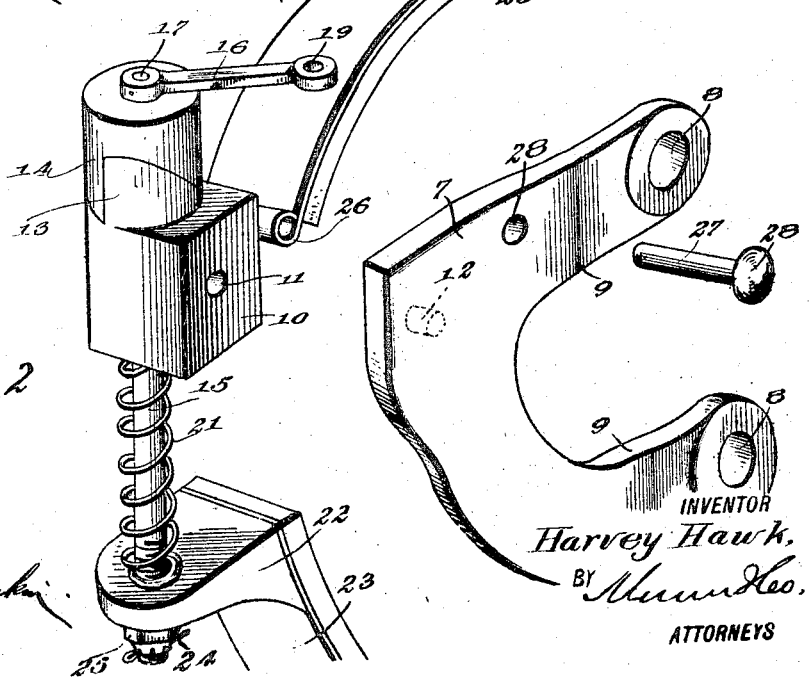
*Fig. 1.*
*Fig. 2*
WITNESSES
INVENTOR
*Harvey Hawk,*
BY
ATTORNEYS Patented Feb. 26, 1924.

1,484,989

UNITED STATES PATENT OFFICE.

HARVEY HAWK, OF GRAMPIAN, PENNSYLVANIA.

BRAKE.

Application filed April 7, 1923. Serial No. 630,522.

*To all whom it may concern:*

Be it known that I, HARVEY HAWK, a citizen of the United States, and a resident of Grampian, in the county of Clearfield and State of Pennsylvania, have invented certain new and useful Improvements in Brakes, of which the following is a specification.

This invention relates to brakes for automobiles and is more particularly directed to an emergency brake for the well-known Ford construction.

An object of the invention is the provision of a brake adapted to more readily and securely grip the annular brake flange connected with the hub of the rear wheels of an automobile.

A further object of the invention is the provision of a brake adapted to replace the usual brake band of the Ford automobile which will be more determinedly and progressively operated for gripping the brake flange of the hub of the rear wheel so that in case of an emergency the brake will readily take hold and stop the car and which brake may be quickly released.

Another object of the invention is the provision of a brake band adapted to replace the usual Ford emergency brake band which is supported by a bracket for maintaining the brake band in a non-dragging position and with freedom to oscillate when the wheels move vertically due to road shocks and the spring suspension.

Other objects and advantages will become apparent during the course of the following description.

The invention is illustrated by way of example in the accompanying drawings, in which, Figure 1 is a vertical section taken transversely of the rear axle housing and adjacent the right rear wheel of a Ford showing an embodiment of my invention applied to the same.

Figure 2 is a view in perspective of an embodiment of my invention with the parts separated.

Referring to the drawings, 1 designates a rear wheel to which is rigidly connected a brake flange 2 on the hub portion of the wheel. The brake flange revolves upon a cup-shaped member 3 having a cooperative flange in engagement with the brake flange 2 and formed integrally with an end of the rear axle housing 4.

A reach rod 5 has a bifurcated rear end mounted upon pins 6 integrally formed with the cup-shaped member 3. Upon the pins 6 is mounted a bracket 7 with the pins passing through the perforations 8 in the ends of the arms 9 of the bracket. The bracket is located between the ends of the reach rod 5 and the cup-shaped member 3.

A block 10 is pivotally mounted at 11 on a pin 12 shown in dotted lines in Figure 2 and which is formed integrally with the bracket 7 and projecting laterally adjacent the forward end of the same. The upper end of the block is provided with a cam member 13 upon which is adapted to ride a cam member 14 which has its opposed faces in engagement with the cooperating fitting faces of the cam member 13.

A shaft 15 is rigidly connected at its upper end with the cam member 14 and slidably and rotatably mounted in a passage of the block 10. A lever 16 connected to the reduced end 17 of the shaft which projects beyond the cam member 14 is adapted to rotate said shaft when the rod 18 is operated. Said rod is pivotally connected at 19 to the free end of the lever 16. The other end of the rod extends to the emergency brake lever which is usual in the Ford construction. The rod 18 is only modified at its outer end 20, as shown in Figure 1, in order to be connected with the free end of the lever 16. No other changes are necessary in the construction of the emergency brake lever or its connecting parts.

A coil spring 21 mounted on the shaft 15 engages the lower face of the block 10 and the upper face of a lug 22 which is secured to the lower end of a brake band 23. The lower end of shaft 15 is threaded for at least an inch and a half to receive an adjusting nut 25. The adjustment of the nut forces the block 10 towards or away from the lug 22 and thereby varies the tension of the spring. A pin 24 locks the nut in position.

The opposite end of the brake band 23 is coiled at 26 to form a socket to receive a pin 27 which is pivotally mounted in the perforation 28 in the bracket 7. One end of the pin is provided with a head 28 while the other end is swaged to form an enlargement and prevent the socket 26 from slipping from the pin 27.

When it is desired to apply the brake, the rod 18 is operated in the direction as indicated by the arrow in Figure 1; hence the lever 16 is oscillated and likewise the cam member 14. As the curved surfaces of the cam member 14 move over the correspondingly opposed curved surfaces of the cam member 13, the cam member 14 will be raised, thereby drawing the ends 22 of the brake band 23 towards end 26 and against the tension of the spring 21. The shaft 15 being rotated with the block 10 sliding downwardly on said shaft by a sufficient movement of the rod 18 in the direction indicated by the arrow will progressively and determinedly apply the brake band 23 which is lined with a "Raybestos" lining 29 which grips the brake flange 2 on the wheel 1. A release of the emergency brake lever will permit the spring 21 to again force the block upwardly on the shaft 15 and place the brake band 23 in spaced relation with the brake flange 2. Due to the spring 21, the action of the band in releasing is practically simultaneous with the release of the usual emergency lever for Ford automobiles.

It will be noted that by my construction the brake will be progressively applied and firmly grip the brake flange 2 of the wheel and prevent further rotation of the wheel.

Whenever the brake band has been released and the automobile is travelling normally over the road bed, the pivotal mounting of the block 10 on the pin 12 of the bracket 7 will permit the wheel to move freely and not be effected by the brake band 23 since the same is movable independently of the wheel. The rapid movement of the brake band towards braking position on the hub flange 2 permits a greater spacing between the liner 29 and the flange 2 than may normally be had with the usual construction of brake bands so that when the automobile is normally travelling the brake band will always be held in non-braking position and thereby prevent wear of the liner 29.

What I claim is:

1. In an emergency brake for the rear wheels of an automobile, a bracket adapted to be secured in a fixed position, a block pivotally connected to the bracket and provided with an upstanding cam member, said cam member and block being provided with a longitudinal central passage, a shaft adapted for rotary movement in the block, the block adapted for slidable movement on the shaft, said shaft being provided with a cam member in operative engagement with the cam on the block, a lever secured to the shaft for rotating the same, a brake band having one end pivotally connected to the bracket and its other end provided with a perforated lug through which one end of the shaft is passed, a nut screwed on the shaft and in engagement with one face of the lug for preventing the shaft from becoming disengaged from said lug, and a spring on the shaft for maintaining said lug and block in spaced relation and the cam members in cooperative engagement, said nut being adapted to vary the tension of the spring.

2. In an emergency brake for the rear wheels of an automobile, a bracket adapted to be secured in a fixed position on the rear axle housing of an automobile, a block pivotally connected to the bracket and provided with an upstanding cam member, said cam member and block being provided with a longitudinal passage, a shaft adapted for rotary movement in the passage in the block and provided with a cam member in cooperative engagement with the cam on the block, means for rotating the shaft, a brake band having one end connected to the shaft with the shaft rotatable in said end of the brake band, the other end of the band being pivotally connected to the bracket, and a resilient means for maintaining the cams in cooperative engagement and the block in spaced relation with the first-mentioned end of the brake band.

3. In an emergency brake for the rear wheels of an automobile, a bracket adapted to be secured in a fixed position, a cam member pivotally mounted on the bracket and provided with a central passage, a shaft mounted for rotation in the passage in the cam member and provided with a cam member in cooperative engagement with the first-mentioned cam, means for rotating the shaft, a brake band having one end pivotally mounted on the bracket and its other end connected with the shaft in such a manner as to permit rotation of the shaft in said end of the brake band, and a resilient means for maintaining the cam members in cooperative engagement.

4. In an emergency brake for the rear wheels of an automobile, a bracket adapted to be secured in a fixed position adjacent said rear wheel, a cam member pivotally mounted on the bracket, a second cam member in cooperative engagement with the first-mentioned cam member, a resilient means for maintaining the cams in cooperative engagement, means for operating the second-mentioned cam member against the tension of the resilient means, a brake band having one end pivotally connected to the bracket and means rotatably mounted in the other end of the brake band and rigidly connected with the second-mentioned cam member, the resilient means being adapted to maintain the first-mentioned cam member in spaced relation with the swiveled end of the brake.

HARVEY HAWK.